United States Patent
Kao et al.

(10) Patent No.: US 9,304,574 B2
(45) Date of Patent: Apr. 5, 2016

(54) REMOTE DEVICE AND POWER SAVING METHOD OF INTERACTIVE SYSTEM

(71) Applicant: PixArt Imaging Inc., Hsin-Chu County (TW)

(72) Inventors: Ming-Tsan Kao, Hsin-Chu (TW); Chia-Cheun Liang, Hsin-Chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 278 days.

(21) Appl. No.: 13/937,920

(22) Filed: Jul. 9, 2013

(65) Prior Publication Data

US 2014/0022168 A1    Jan. 23, 2014

Related U.S. Application Data

(63) Continuation-in-part of application No. 13/446,524, filed on Apr. 13, 2012, now Pat. No. 9,058,064.

(30) Foreign Application Priority Data

Jul. 30, 2012   (TW) .............................. 101127535 A

(51) Int. Cl.
- *G06F 1/32* (2006.01)
- *G06F 3/03* (2006.01)
- *G06F 3/0346* (2013.01)
- *G06F 3/038* (2013.01)
- *G06F 3/0354* (2013.01)

(52) U.S. Cl.
CPC ............ *G06F 1/3259* (2013.01); *G06F 1/3206* (2013.01); *G06F 3/0325* (2013.01); *G06F 3/0346* (2013.01); *G06F 3/0386* (2013.01); *G06F 3/03542* (2013.01); *Y02B 60/1253* (2013.01); *Y02B 60/148* (2013.01)

(58) Field of Classification Search
CPC .... G06F 1/3206; G06F 1/3259; G06F 3/0325; G06F 3/0346; G06F 3/03542; G06F 3/0386; Y02B 60/1253; Y02B 60/148; G09G 2360/14–2360/148
See application file for complete search history.

(56) References Cited

U.S. PATENT DOCUMENTS

| | | | |
|---|---|---|---|
| 6,784,928 B1 * | 8/2004 | Sakurai et al. | ............. 348/220.1 |
| 7,619,669 B2 | 11/2009 | Barna | |
| 7,738,013 B2 | 6/2010 | Galambos | |
| 7,839,388 B2 | 11/2010 | Cheah | |

(Continued)

FOREIGN PATENT DOCUMENTS

| TW | I267754 B | 12/2006 |
|---|---|---|
| TW | I338241 | 8/2007 |

(Continued)

*Primary Examiner* — Nalini Mummalaneni
*Assistant Examiner* — Ivelisse Martinez Quiles
(74) *Attorney, Agent, or Firm* — Hauptman Ham, LLP

(57) ABSTRACT

A remote device includes an image sensor, a readout circuit and a processing unit. The image sensor successively captures a first image and a second image containing at least one reference beacon image. The readout circuit is configured to read first image data of the first image and second image data of the second image from the image sensor. The processing unit is configured to calculate an image feature of the at least one reference beacon image according to the first image data and control the readout circuit to only read the second image data of a range of interest in the second image according to the image feature. There is further provided a power saving method of an interactive system.

20 Claims, 8 Drawing Sheets

(56) References Cited

U.S. PATENT DOCUMENTS

| | | | |
|---|---|---|---|
| 2006/0011810 A1* | 1/2006 | Ando et al. | 250/208.1 |
| 2006/0033822 A1* | 2/2006 | Lee et al. | 348/222.1 |
| 2006/0152489 A1* | 7/2006 | Sweetser et al. | 345/158 |
| 2007/0018966 A1* | 1/2007 | Blythe et al. | 345/173 |
| 2007/0024587 A1 | 2/2007 | Shiau | |
| 2008/0039202 A1 | 2/2008 | Sawano et al. | |
| 2008/0180396 A1* | 7/2008 | Lin et al. | 345/158 |
| 2008/0278445 A1* | 11/2008 | Sweetser et al. | 345/158 |
| 2008/0284724 A1* | 11/2008 | Alten | 345/156 |
| 2009/0040349 A1* | 2/2009 | Xu | 348/302 |
| 2011/0032230 A1* | 2/2011 | Sun et al. | 345/207 |
| 2011/0095980 A1* | 4/2011 | Sweetser et al. | 345/158 |
| 2012/0105661 A1* | 5/2012 | Wong et al. | 348/222.1 |
| 2013/0082923 A1* | 4/2013 | Lin et al. | 345/157 |
| 2013/0093675 A1* | 4/2013 | Lin et al. | 345/158 |
| 2013/0120252 A1* | 5/2013 | Lam et al. | 345/157 |

FOREIGN PATENT DOCUMENTS

| | | |
|---|---|---|
| TW | 200912700 | 9/2007 |
| TW | 200943131 | 4/2008 |

\* cited by examiner

REMOTE DEVICE AND POWER SAVING METHOD OF INTERACTIVE SYSTEM

CROSS REFERENCE TO RELATED APPLICATION

This application is a continuation in part application of U.S. Ser. No. 13/446,524 filed on Apr. 13, 2012 and claims the priority benefit of Taiwan Patent Application Serial Number 101127535 filed on Jul. 30, 2012, the full disclosures of which are incorporated herein by reference.

BACKGROUND

1. Field of the Disclosure

This disclosure generally relates to an interactive system and, more particularly, to a remote device and a power saving method of an interactive system that perform the object tracking by reading only a part of pixel data of a sensing matrix.

2. Description of the Related Art

The conventional game remote controller, e.g. the one disclosed in Taiwan Patent No. 1267754 and entitled "pointer positioning device of a video camera", can be applied to a light gun game. The pointer positioning device has a control circuit disposed in a photographic pointing device and coupled to a camera, a calculation unit and a transmission interface respectively. The transmission interface is connected to a host. A filter is disposed in front of the camera and several lighting devices are disposed on a display screen for being captured by the camera. When a user runs the program executed by the host using the photographic pointing device, the camera is used to capture the display screen. And as the camera is integrated with the filter, light outside the spectrum of the lighting devices will be removed such that images captured by the camera only contain the lighting devices. The images are sent to the calculation unit for calculating the coordinate of an aiming point of the camera to be sent to the host, and the host can perform the corresponding control according to the coordinate.

However in practical use, in order to improve the operational convenience, the remote controller communicates with the host via wireless transmission and a battery module is used to provide all power needed by the remote controller. As the remote controller may include a plurality of power consuming devices, it is necessary to reduce the power consumption of each device so as to extend the lifetime of the battery. Generally in order to improve the accuracy of calculating the coordinate of the aiming point, the camera preferably captures images at a higher sampling frequency. However, the high sampling frequency can increase the computing load of the calculation unit such that the total power consumption of the remote controller is increased and the lifetime of the battery is shortened.

Taiwan Patent Publication No. 200912700 discloses a displacement detection apparatus and an energy-efficient method for the same. The displacement detection device is a mouse and includes a light source and an image capturing unit, wherein the image capturing unit is configured to successively capture images of a surface to which the light source projects light. The displacement detection device calculates a position difference of the reference object in the captured images so as to obtain a motion vector. When the motion vector is smaller than a threshold with a predetermined time, the displacement detection device is identified to operate in an idle state rather than in an operating state. If the displacement detection device is in the idle state, a lighting frequency of the light source is decreased so as to reduce the power consumption. Similarly, Taiwan Patent Publication No. 200943131 discloses a motion estimation device and a power saving method thereof that may adjust a lighting cycle of the light source according to the displacement of the motion estimation device between two successive lighting durations of the light source so as to reduce the power consumption.

Different from subjects of the above two published specifications regarding the mouse, Taiwan Patent No. 1338241 discloses an interactive image system, an interactive device and an operative method thereof that may real-timely adjust a sampling frequency of an image module in the interactive device so as to reduce the power consumption thereof. The methods of reducing the sampling frequency of the image module or the lighting frequency of the light source mentioned in the prior art are all performed by retrieving and processing image data of the whole image frame, and thus the power consumption can not be effectively reduced.

Other related patents may be referred to the U.S. Pat. No. 7,839,388, U.S. Pat. No. 7,738,013, U.S. Pat. No. 7,619,669 and the U.S. Patent Publication No. US 2007/0024587.

Accordingly, the present disclosure further provides a remote device and a power saving method of an interactive system that may select to read only a part of pixel data of a sensing matrix according to an image feature of the reference beacon image thereby reducing the total power consumption of the image sensing device.

SUMMARY

The present disclosure provides a remote device and a power saving method of an interactive system that may still perform the interactive operation without reading all pixel data of the sensing matrix of an image sensor.

The present disclosure further provides a remote device and a power saving method of an interactive system that may estimate a range of interest of a next image according to an image feature of at least one reference beacon image in a current image and may reduce the power consumption by only reading the pixel data of the range of interest in the sensing matrix.

The present disclosure provides a remote device including an image sensor, a readout circuit and a processing unit. The image sensor is configured to successively capture a first image and a second image containing at least one reference beacon image. The readout circuit is configured to read first image data of the first image and second image data of the second image from the image sensor. The processing unit is configured to calculate an image feature of the at least one reference beacon image according to the first image data and control the readout circuit to read only the second image data of a range of interest in the second image according to the image feature, wherein the range of interest is smaller than the second image.

In one aspect, the image feature includes at least one of an image position, an image size, an image intensity and a motion vector of the at least one reference beacon image.

In one aspect, the processing unit determines a first range of interest in the first image according to an image position of the at least one reference beacon image and estimates, corresponding to the first range of interest, a second range of interest in the second image according to a motion vector of the at least one reference beacon image or an expansion parameter, wherein the motion vector and the expansion parameter are predetermined values or calculated by the processing unit according to a plurality of images previous to the second image.

In one aspect, the image sensor further captures a pretreatment image containing the at least one reference beacon image before capturing the first image, and the readout circuit reads image data of partial rows of the pretreatment image. The processing unit determines a first range of interest according to the at least one reference beacon image in the image data of partial rows of the pretreatment image and controls the readout circuit to only read the first image data of the first range of interest in the first image for calculating the image feature, wherein the image data of partial rows of the pretreatment image is image data of odd rows or even rows of the pretreatment image.

In one aspect, the processing unit controls the readout circuit to further read the second image data of partial rows of the second image outside the range of interest to perform the debugging operation.

The present disclosure further provides a power saving method of an interactive system including the steps of: successively capturing, using an image sensor, a pretreatment image and a first image containing at least one reference beacon image; reading, using a readout circuit, image data of partial rows of the pretreatment image; determining, using a processing unit, a first range of interest according to the at least one reference beacon image in the image data of partial rows of the pretreatment image; reading, using the readout circuit, only first image data of the first range of interest in the first image; and calculating, using the processing unit, an image feature of the at least one reference beacon image according to the first image data.

In one aspect, the power saving method of an interactive system further includes the steps of: capturing, using the image sensor, a second image containing the at least one reference beacon image; and controlling, using the processing unit, the readout circuit to only read second image data of a second range of interest in the second image according to the image feature, wherein the second range of interest is smaller than the second image.

The present disclosure further provides a power saving method of an interactive system including the steps of: sequentially capturing, using an image sensor, a first image and a second image containing at least one reference beacon image; reading, using a readout circuit, all image data of the first image; calculating, using a processing unit, an image feature of the at least one reference beacon image according to the all image data of the first image; and controlling, using the processing unit, the readout circuit to read only image data of a range of interest in the second image according to the image feature, wherein the range of interest is smaller than the second image.

In the remote device and the power saving method of an interactive system according to the embodiment of the present disclosure, as the readout circuit only reads a part of image data of the sensing matrix, it is able to effectively reduce the power consumption of data processing components such as the programmable gain amplifier (PGA), the analog-to-digital converter (ADC) and the processing unit. In addition, as reading time of the image data is reduced at the same time, it is able to increase the frame rate thereby improving the system response speed.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure may be adapted to the running of the interactive game program on a game host, the remote browsing of the web page on a display device and the remote operation of other multimedia systems (e.g. a smart TV). As the game host is the most common application, descriptions below are made based on a game host.

Figure 1:
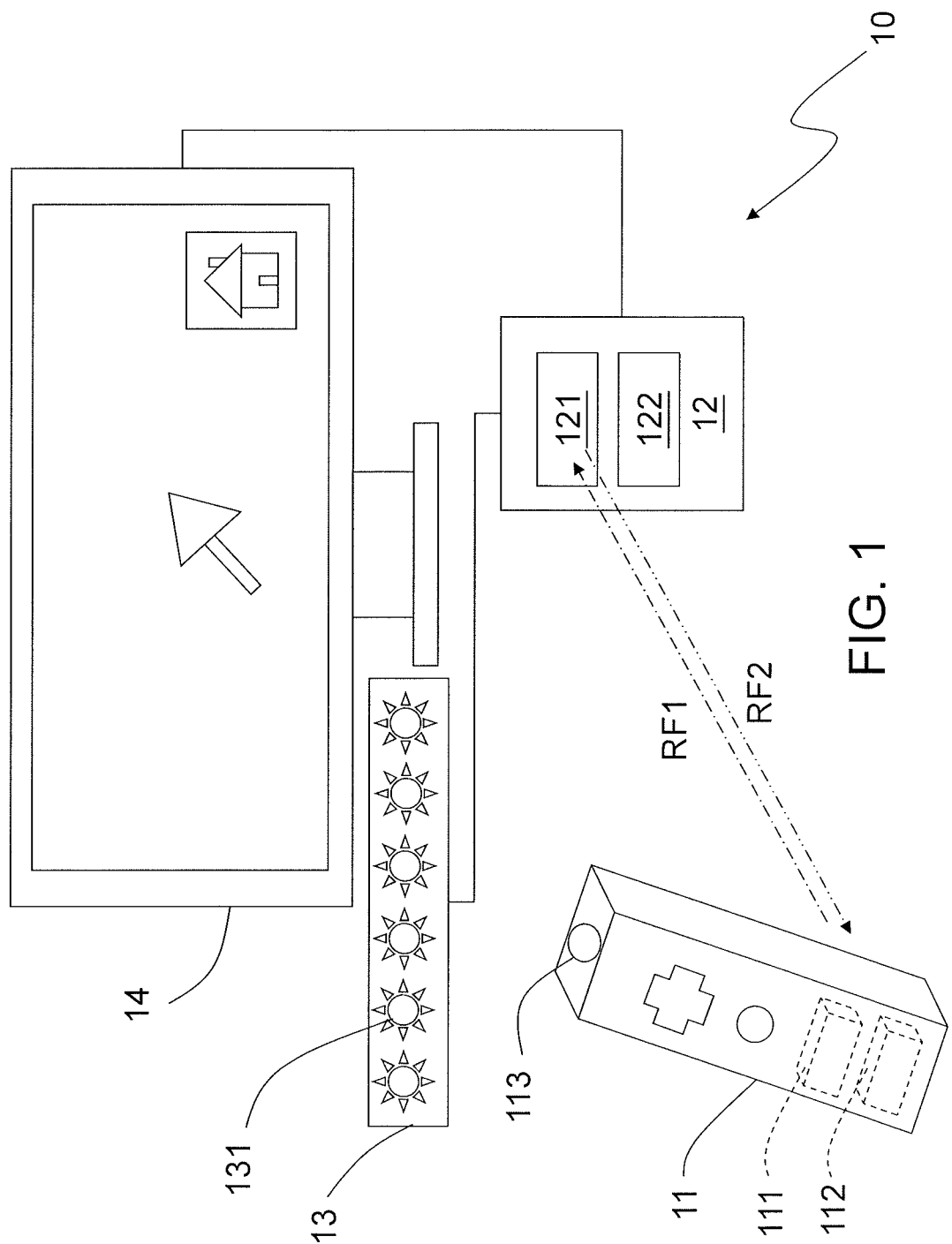
FIG. 1 shows a schematic diagram of the interactive image system according to an embodiment of the present disclosure.

Referring to FIG. 1, it shows a schematic diagram of the interactive image system according to an embodiment of the present disclosure. The interactive image system 10 includes an interactive control device 11, a host 12, a light source 13 and an image display 14. Embodiments of the host 12 may be a game host, a computer system mainframe or an interactive image player, and the host 12 is configured to execute interactive game programs and generate interactive images to be shown on the image display 14 for being operated by a user. The host 12 may include a wireless module 121 and a processing unit 122. The host 12 transmits data (e.g. RF1 and RF2) via the wireless module 121 to and from a wireless module 111 in the interactive control device 11. The processing unit 122 may execute interactive games according to the data. The host 12 may also be wired or wirelessly connected to the image display 14. Or the host 12 may be directly integrated inside the image display 14.

A cursor may be shown on a screen of the image display 14, such as an aiming point of a light gun or a selection arrow of an icon, but not limited thereto. The interactive control device 11 may include the wireless module 111, a control circuit 112 and an image sensor 113, wherein the image sensor 113 is configured to capture the image of a plurality of reference points 131 in the light source 13, and the control circuit 112 may determine a position, a moving direction and a movement of the interactive control device 11 according to the image of the reference points 131; i.e. the position and displacement of the cursor.

Embodiments of the reference points 131 of the light source 13 may be, but not limited to, reference points of various shapes formed by arranging a plurality of infrared light emitting diodes or lighting units of a predetermined spectrum. The reference points 131 may be electrically coupled to the host 12 or the image display 14 or have their own power source for providing the power for lighting. The light source 13 may also be integrated in the image display 14 or the host 12. In addition, the number of the reference points 131 is not limited to six as shown, and one or a plurality of reference points 131 may be employed. The interactive control device 11 captures the image of the reference points 131 so as to identify the relative position and/or the angle variation of the interactive control device 11 with respect to the reference points thereby correspondingly controlling the position and movement of the cursor on the image display 14. The interactive control device 11 is configured to control a game program or computer software executed by the host 12. When the host 12 runs the game program, the interactive control device 11 may be served as, but not limited to, a light gun, a billiard club, a golf club, a tennis racket, a bat, a badminton racket or a table tennis bat configured to control the game operation. When the host 12 executes the computer software, the interactive control device 11 may be served as a pointer (cursor) positioning device configured to control the computer software.

Figure 2A:
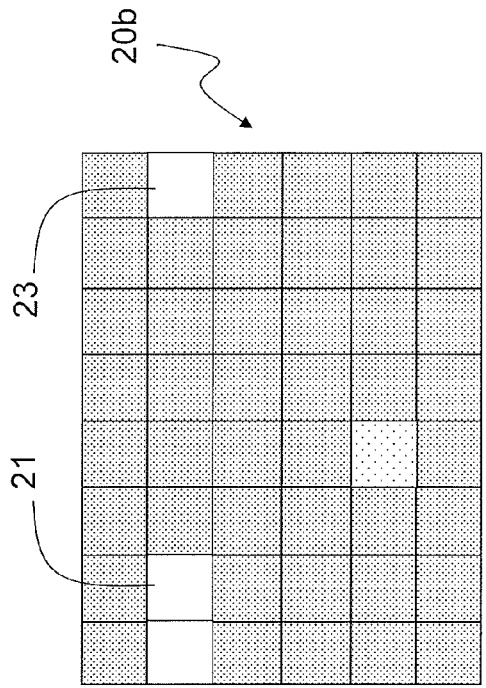
FIGS. 2A-2D show image frames containing a plurality of reference point images captured by the interactive control device of the present disclosure.

FIGS. 2A-2D show image frames containing a plurality of reference point, images captured by the interactive control device of the present disclosure. In FIGS. 2A-2D, image frames 20a-20d are formed by a plurality of reference points imaging on the image sensor 113. FIG. 2A shows a complete image frame captured in an idle state, and the reference point image is referred to the imaging area of the reference point (i.e. the bright dot). Herein the reference point images 21-23 are only exemplary, and one reference point image is not limited to be formed by one pixel unit. Herein one pixel unit may represent a plurality of pixels. In addition, the image frames 20a-20d are captured by the interactive control device 11 in the idle state, and the mechanism of switching from an operating state to an idle state may use any method known in the prior art. For example, the above method of entering the idle state using the motion vector is included in the scope of the present disclosure.

In FIG. 2A, three reference point images 21-23 are contained in the image frame 20a, and blank areas herein are used to represent the three reference point images 21-23. Other matrix areas filled with sparse dots are pixel units that the image sensor 113 scanned and found no reference point image. The image frame 20a is formed by the image sensor 113 scanning every pixel unit.

Figure 2B:
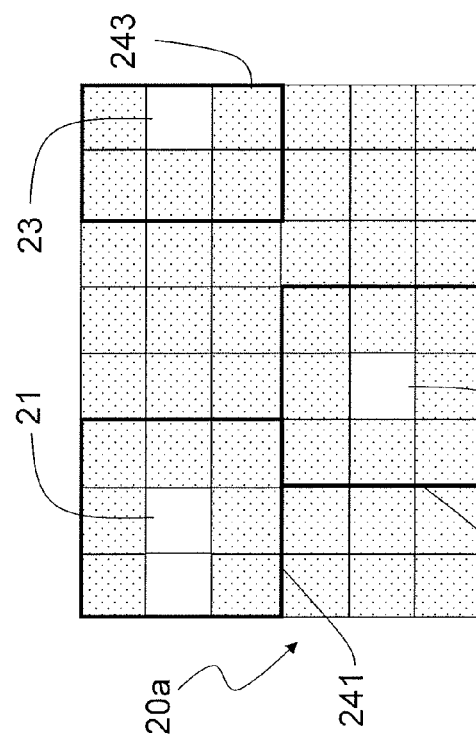

In FIG. 2B, the image frame 20b is obtained by scanning the pixel cell corresponding to the three reference point images in the image frame 20a with the image sensor 113, and other pixel cells are closed so as to effectively reduce the power consumption, wherein matrix areas filled with dense dots herein represent the pixel units that are not turned on. That is, the control circuit 112 of the interactive control device 11 may turn on the pixel cells corresponding to the three reference point images 21-23 in the image frame 20a and only scan those pixel cells being turned on. Herein the reference point images 21 and 23 are scanned at the same positions, but the reference point image 22 is not scanned at its original position. Therefore, the control circuit 112 may switch the interactive control device 11 from the idle state to the operating state.

In order to confirm that at least one reference point image in the image frame 20b is not at its original position as in the image frame 20a so as to switch the interactive control device 11 to the operating state, the control circuit 112 may compare a threshold with brightness information of the pixels in the image frame 20b corresponding to the three reference point images 21-23 in the image frame 20a. For example, if the brightness value or average brightness value of the pixel unit in the image frame 20b corresponding to the reference point image 22 in the image frame 20a is lower than a predetermined threshold, it is able to identify that the reference point image 22 or the bright point has left its original position in the image frame 20a. On the contrary, if the brightness of the pixel unit is still higher than a predetermined threshold, it may assume that the reference point image 22 is still at its original position in the image frame 20a. If the reference point images 21 and 23 are also at their original positions, it may assume that the interactive control device 11 is still in the idle state. When the interactive control device 11 is still in the idle state, the control circuit 112 may further decrease the frame rate of the image sensor 113 or the lighting frequency of the light source 13 so as to reduce the power consumption. It may be set that the operating state is entered if one bright dot disappears or the idle state is kept if one bright dot still exists according to the system requirement. It is also able to set that the idle state is maintained when at least N bright dots still exist.

In one embodiment, one or a plurality of thresholds may be used. For example, all pixels in the image frame 20b may be compared with the same threshold. Or every pixel may be compared respectively with different thresholds and herein the different thresholds may be a ratio or an offset of the gray value of every pixel in a previous image frame before entering the idle state.

Figure 2C:
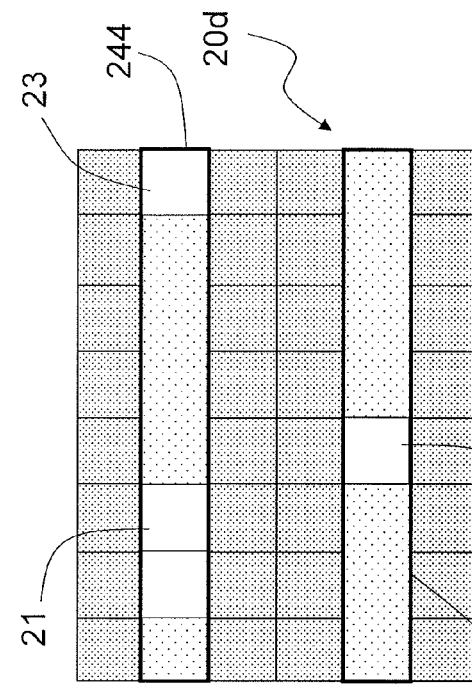

In FIG. 2B only the pixel cells corresponding to the three reference point images in the image frame 20a are scanned. However, the interactive control device 11 may be misidentified to leave the idle state due to noise or the tiny vibration of the table surface on which the device is placed. It is able to expand the scanning region from the pixel cells of the three reference point images in the image frame 20a to select more pixel cells to be scanned. For example FIG. 2A includes three pixel areas 214-243 served as the scanning region that may be referred to regions of interest herein; that is, pixel cells of other regions will be turned off in scanning a next image frame. In the present disclosure, the pixel area may be the expanded scanning region or the original pixel region that the reference point images locate. FIG. 2C shows the image frame 20c obtained in scanning the next image frame in which the reference point images 22-23 in the pixel areas 242-243 do not change their positions but the reference point image 21 in the pixel area 241 changes its position. As the reference point image 21 is still within the pixel area 241, the control circuit 112 may identify that the interactive control device 11 does not end the idle state. Or if at least one bright dot still exists within the pixel area 241, the interactive control device 11 may be identified not leaving the idle state. It is able to identify that a bright dot exists when the brightness value of a pixel is larger than a predetermined threshold.

Figure 2D:
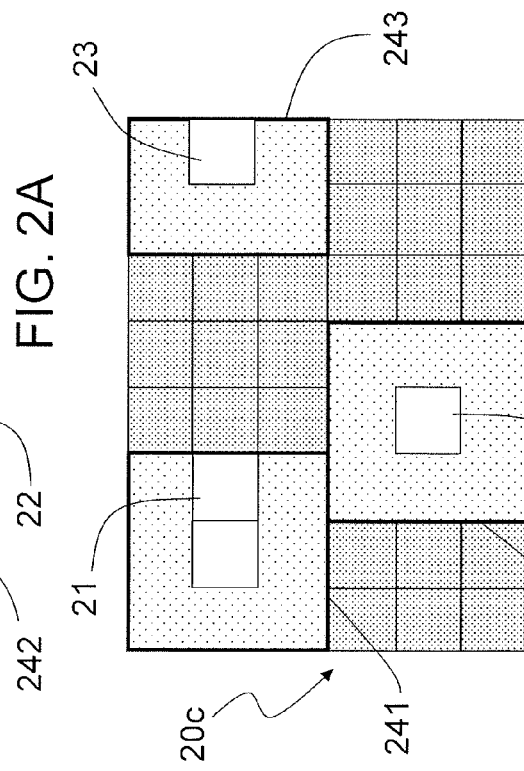

Referring to FIG. 2D, in the image frame 20d pixel areas 244 and 245 are pixel rows selected according to the three reference point images 21-23 in the image frame 20a to be served as scanning regions. In other embodiment, it is also able to select the whole pixel columns as the scanning regions. The scanning region in the above embodiment may be pixel cells equal to, larger than or smaller than the reference point images 21-23.

The above embodiment is described by schematic diagrams and this paragraph takes an actual example to further describe the details. It may assume that an image sensor includes 128×96 pixel cells and a first image frame contains two reference point images each having a size between 30-50 pixels. It may assume that the two pixel areas respectively have 50 pixels such that the image sensor only has to turn on 0.81% of the pixel cells calculated by (50×2)/(128×96) =0.00813. Similarly, the circuit module configured to process signals and images in the interactive control device 11 may reduce the number of processed pixels with the same scale so that the power consumption may be further reduced.

Figure 3:
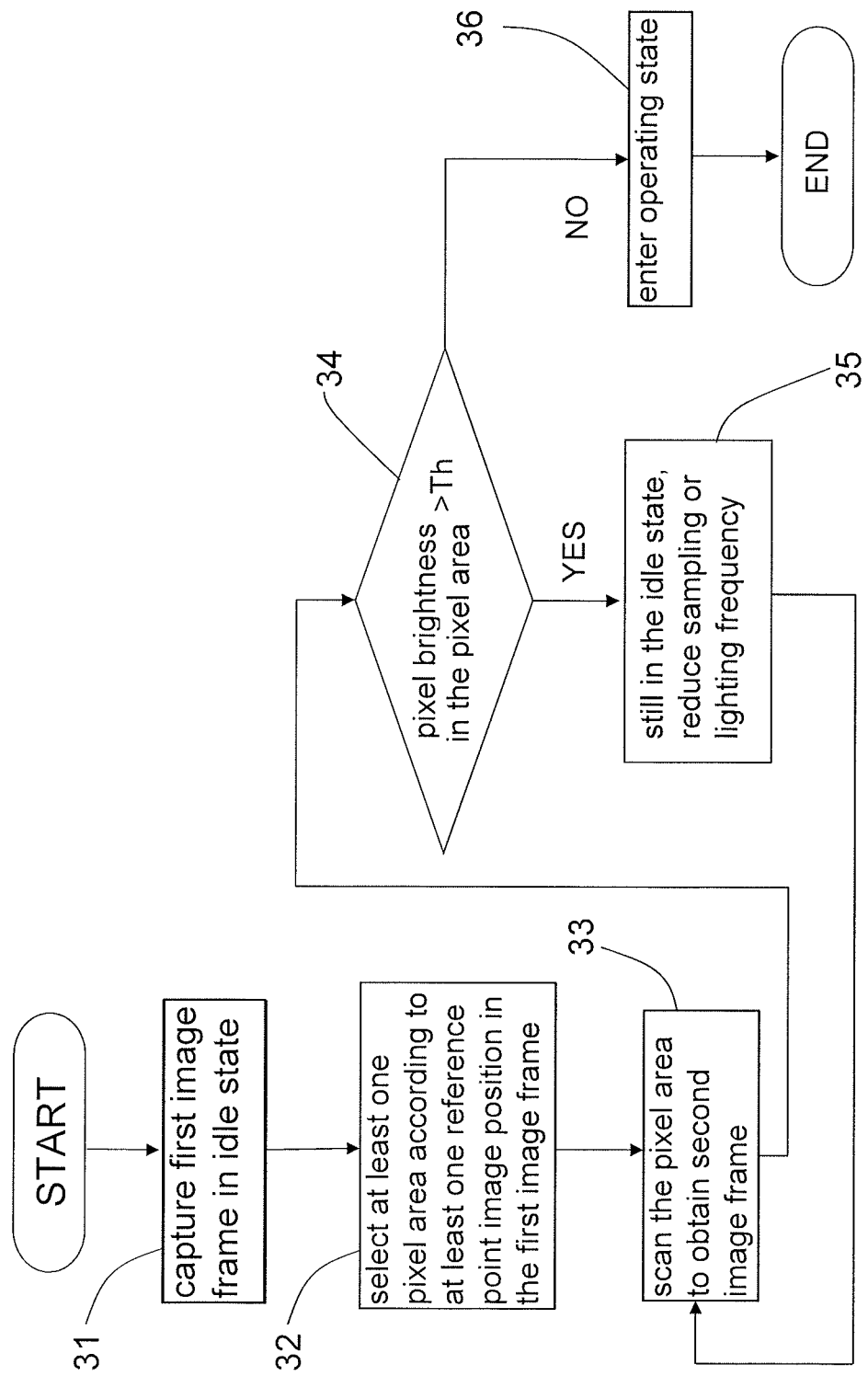
FIG. 3 shows a flow chart of the operation of confirming an idle state in the present disclosure.

FIG. 3 shows a flow chart of the operation of the interactive image system of the present disclosure. Referring to step 31, in the idle state the interactive control device may turn on all pixel cells (or substantially all pixel cells) of the image sensor to capture a first image frame. At least one pixel area is selected according to the position of at least one reference point image in the first image frame and the pixel area may be an identical region or an expanded region of pixel cells corresponding to the reference point image as shown in step 32. According to step 33, the image sensor scans the pixel cell in the pixel area to obtain a second image frame. As shown in step 34, the brightness information, e.g. a brightness value or an average brightness value, of at least one pixel in the pixel area in the second image frame is compared with a threshold Th so as to identify whether the interactive control device is still in the idle state. As shown in step 35, when the interactive control device is confirmed to be in the idle state, further reduce the frame rate of the image sensor or the lighting frequency of the light source thereby reducing the power consumption. If the frame rate and the lighting frequency have reached the lowest value, they may not be adjusted and the process directly moves to step 33. On the contrary, if the brightness value of the pixel is lower than the threshold Th, it is able to identify that the reference point image is not at its original position in the first image frame and thus the interactive control device is asked to enter the operating state as shown in step 36.

Figure 4A:
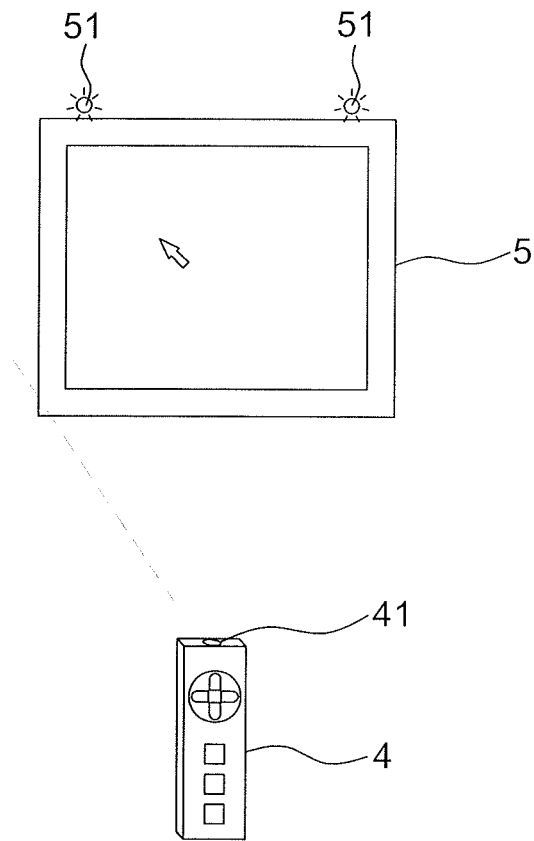
FIG. 4A shows a schematic diagram of the interactive system according to an embodiment of the present disclosure.
Figure 4B:
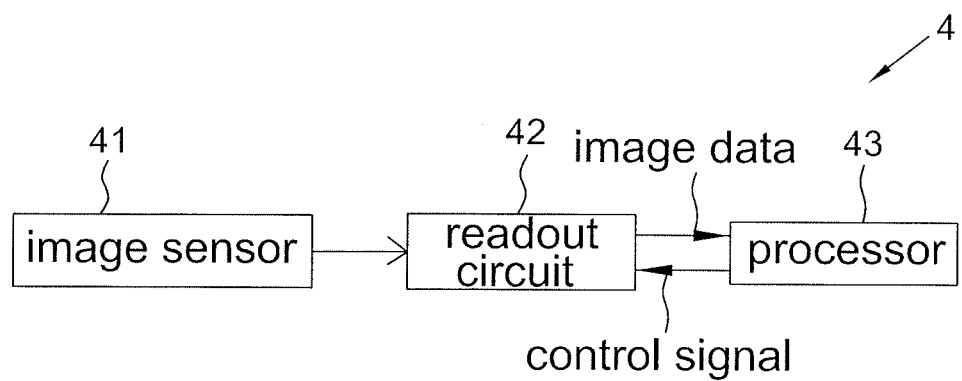
FIG. 4B shows a schematic block diagram of the remote device of the interactive system according to an embodiment of the present disclosure.

Referring to FIGS. 4A and 4B, FIG. 4A shows a schematic diagram of the interactive system according to an embodiment of the present disclosure, and FIG. 4B shows a schematic block diagram of the remote device of the interactive system according to an embodiment of the present disclosure. The interactive system according to the embodiment of the present disclosure includes a remote device 4, an image display 5 and at least one reference beacon (e.g. two reference beacons 51 are shown herein), wherein the reference beacon 51 may be integrated with the image display 5, or may be separated from the image display 5 and powered by an independent power source. The reference beacon 51 preferably emits invisible light or emits light with a predetermined emission pattern so as to distinguish from ambient light. The reference beacon 51 may be a light emitting diode, a laser diode or other active light sources without any limitation. In other embodiments, the reference beacon 51 may be shown in the image displayed by the image display 5. It should be mentioned that a number of the reference beacon 51 may be determined according to the algorithm configured to track the reference beacon 51 and is not limited to any specific number.

The image display 5 may be the device configured to display images such as a smart TV, a game machine screen, a projection screen and a computer screen. In this embodiment, the remote device 4 is configured to capture images containing the at least one reference beacon 51 and interact with the image display 5 according to the image variation (e.g. the position variation and/or angle variation) of at least one reference beacon image in the captured images, e.g. controlling the application executed by the image display 5 or controlling the image or cursor shown on the image display 5, wherein the function of a remote device interacting with a display device is well known and thus details thereof are not described herein. The present disclosure is to reduce the power consumption of the remote device 4 during operation.

The remote device 4 includes an image sensor 41, a readout circuit 42 and a processing unit 43, wherein the image sensor 41 captures images with a fixed or an adjustable frame rate. The readout circuit 42 reads all or a part of image data of the captured image frame from the image sensor 41 and sends the read image data to the processing unit 43. The processing unit 43 post-processes the image data and controls the readout circuit 42 (e.g. by sending a control signal) to select the area of image data to be read from the image sensor 41. The processing unit 43 may further interact with the image display 5 according to the image data.

Figure 5:
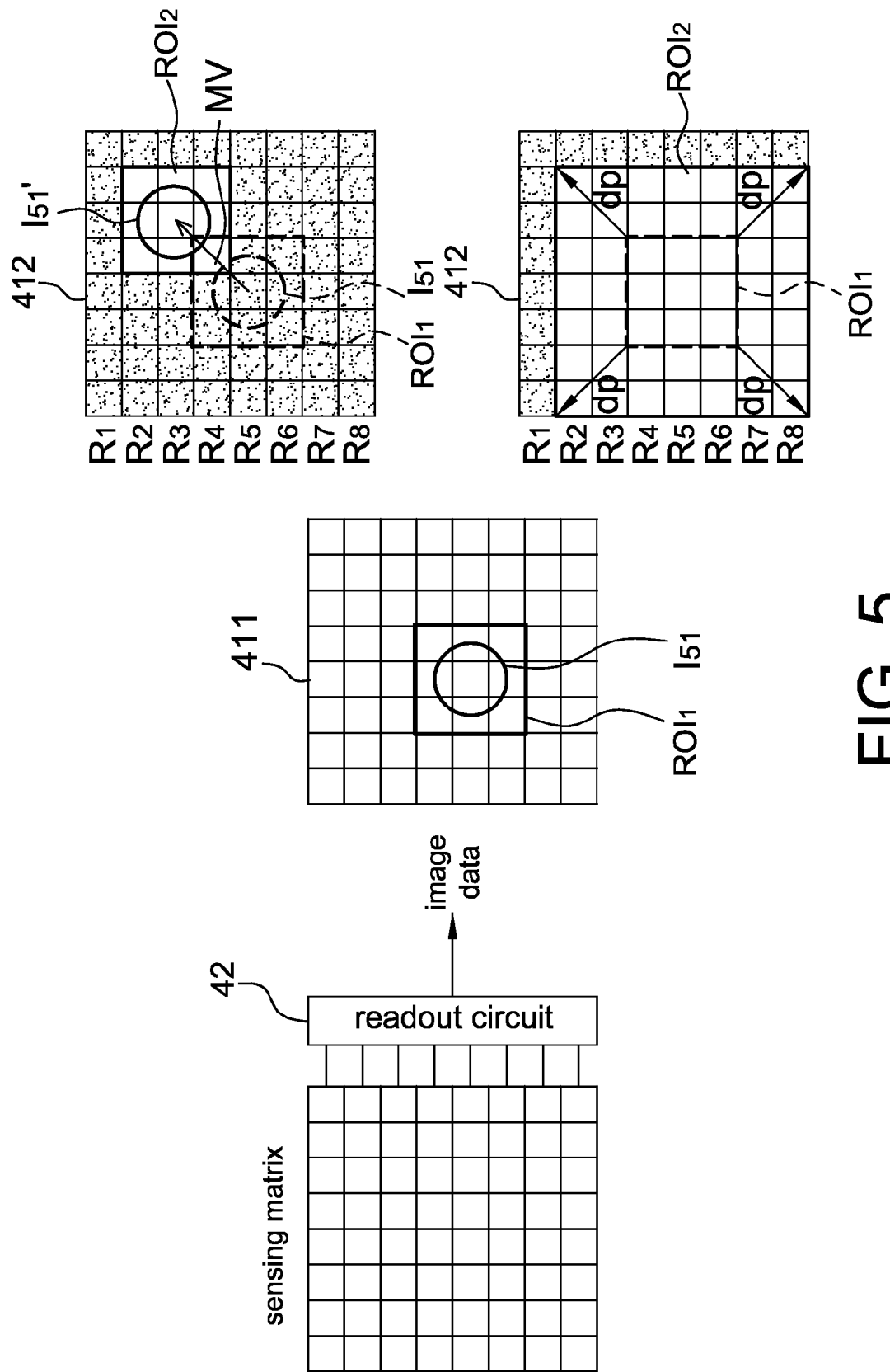
FIG. 5 shows an operational schematic diagram of the interactive system according to a first embodiment of the present disclosure.

Referring to FIGS. 4B and 5, the operation of the interactive system according to a first embodiment of the present disclosure is described hereinafter.

The image sensor 41 is preferably an active image sensor, such as a CMOS image sensor, including a sensing matrix (e.g. an 8×8 sensing matrix is shown herein) and is configured to capture images at a frame rate. For example in FIG. 5, the image sensor 41 successively captures a first image 411 and a second image 412 respectively containing at least one reference beacon image $I_{51}$ and $I_{51}'$. In this embodiment, the first image 411 and the second image 412 are image data sensed by the sensing matrix of the image sensor 41; i.e. the first image 411 and the second image 412 are formed by every pixel data (i.e. the gray value) of the sensing matrix. The readout circuit 42 reads first image data of the first image 411 and second image data of the second image 412 from the image sensor 41. In the first embodiment, the first image data includes all pixel data of the first image 411 and the second image data includes only a part of pixel data of the second image 412. In other words, in the first embodiment the readout circuit 42 may select to read a part of pixel data of the image captured by the image sensor 41. In one embodiment, as pixel gray values of the reference beacon images $I_{51}$ and $I_{51}'$ are higher than the background gray values (i.e. the pixel area outside the reference beacon images $I_{51}$ and $I_{51}'$), it is able to identify the pixel areas in the first image 411 and the second image 412 having the pixel gray values higher than a threshold as the reference beacon images $I_{51}$ and $I_{51}'$, and the threshold may be determined according to different applications, wherein the method of identifying a reference beacon image in an image frame is well known and thus details thereof are not described herein.

The processing unit 43 may be a digital signal processor (DSP) and is configured to calculate an image feature of the at least one reference beacon image $I_{51}$ according to the first image data, e.g. including at least one of an image position, an image size, an image intensity and a motion vector of the reference beacon image $I_{51}$. The processing unit 43 further determines a range of interest (ROI) of the sensing matrix according to the image feature so as to control the readout circuit 42 to read only the second image data of the range of interest ROI in the second image 412, wherein in order to reduce the power consumption of the remote device 4 during operation, e.g. the power consumption of the readout circuit 42, a programmable gain amplifier (PGA), an analog-to-digital converter (ADC) and the processing unit 43, the range of interest ROI is smaller than the second image 412. For example, it may assume that a size of the sensing matrix is 128×96 and a size of the reference beacon image $I_{51}$ is 50 pixels; and thus in the embodiment including two reference beacons 51, the range of interest ROI is 0.81% of the sensing matrix. Therefore, the data amount being read and post-processed are significantly reduced.

Figure 6:
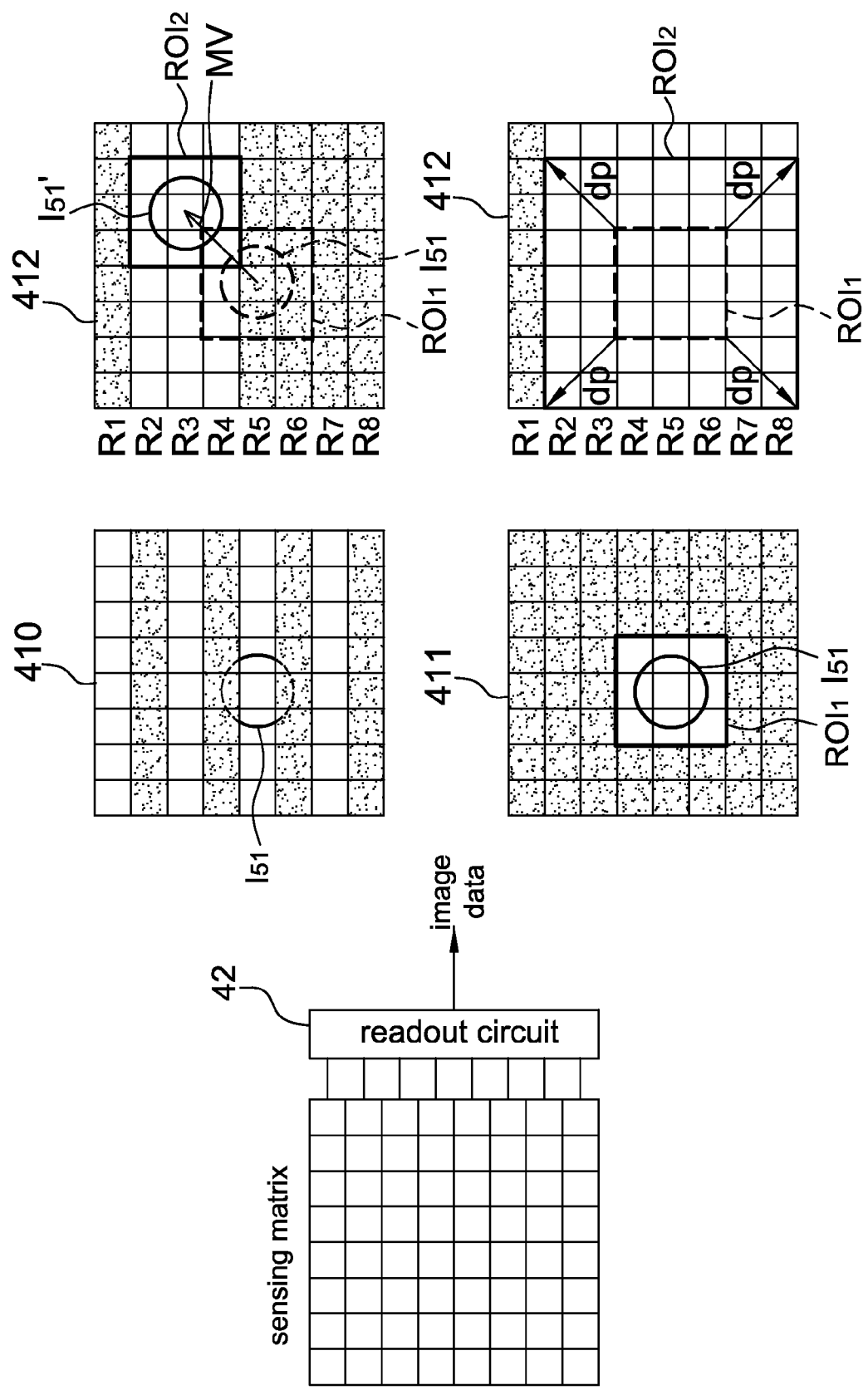
FIG. 6 shows an operational schematic diagram of the interactive system according to a second embodiment of the present disclosure.

In addition, as the plurality of pixels of the sensing matrix are arranged in a matrix, the range of interest ROI may be a rectangle pixel area (e.g. $ROI_2$ shown in FIG. 5) or a plurality of pixel rows (e.g. pixel rows $R_2$-$R_4$ or pixel rows $R_2$-$R_8$ shown in FIG. 6). In other embodiments, a shape of the range of interest ROI may be the pixel area having a predetermined shape which is determined according to the shape of the reference beacon 51 and is not limited to those shown in FIGS. 5 and 6. It should be mentioned that in FIG. 5, areas filled with sparse dots in the second image 412 are the pixel areas that are not read by the readout circuit 42.

In one embodiment, the processing unit 43 may determine a first range of interest $ROI_1$ in the first image 411 according to an image size and an image position of the at least one reference beacon image $I_{51}$ and estimate a second range of interest $ROI_2$ in the second image 412 corresponding to the first range of interest $ROI_1$ according to a motion vector MV (e.g. a direction vector from the reference beacon image $I_{51}$ to $I_{51}'$ shown in the top right diagram) of the reference beacon image $I_{51}$, wherein the pixel position may be a gravity center or a center of the reference beacon image $I_{51}$ and the image size may be the number of pixels in the image having the pixel gray value larger the a threshold. According to different embodiments, the ranges of interest $ROI_1$ and $ROI_2$ may be larger than or equal to the image sizes of the reference beacon images $I_{51}$ and $I_{51}'$. In this embodiment, the motion vector MV may be a predetermined value or calculated by the processing unit 43 according to a plurality of images captured previous to the second image 412 (e.g. may or may not include the first image 411). For example, the predetermined value of the motion vector MV may be previously set according to the operation parameter of the interactive system (e.g. including a size of the reference beacon 51 and an operation distance of the remote device 4), or the motion vector MV may be obtained according to the relationship (e.g. the correlation) between a plurality of images captured previous to the second image 412, wherein the motion vector MV may include information of the moving direction and displacement.

In another embodiment, the processing unit 43 may determine a first range of interest $ROI_1$ in the first image 411 according to an image size and an image position of the at least one reference beacon image $I_{51}$ and estimate a second range of interest $ROI_2$ in the second image 412 according to an expansion parameter dp (as shown in the lower right diagram), wherein the expansion parameter dp may be a predetermined value or calculated by the processing unit 43 according to a plurality of images captured previous to the second image 412; e.g. using the motion vector MV calculated according to a plurality of images captured previous to the second image 412 (e.g. may or may not include the first image 411) as the expansion parameter dp or previously setting the expansion parameter dp according to the operation parameter of the interactive system (e.g. the expansion parameter dp is shown to be two pixels expanding outward). In addition, in the above two embodiments the image size may be previously set according to the operation parameter of the interactive system (e.g. a size of the reference beacon 51 and an operation distance of the remote device 4). Therefore, the processing unit 43 may determine a first range of interest $ROI_1$ in the first image 411 only according to an image position of the at least one reference beacon image $I_{51}$.

Referring to FIGS. 4B and 6, the operation of the interactive system according to a second embodiment of the present disclosure is described hereinafter. This embodiment is configured to reduce the power consumption of the remote device 4 when the image sensor 41 has not captured the at least reference beacon image $I_{51}$.

In this embodiment, the image sensor 41 further captures a pretreatment image 410 containing the at least one reference beacon image $I_{51}$ before capturing the first image 411; i.e. the pretreatment image 410 is not used to calculate the image variation of the reference beacon 51 but to identify whether the reference beacon image is captured and to identify the image position of the reference beacon image. The readout circuit 42 reads image data of partial rows of the pretreatment image 410, wherein the image data of partial rows of the pretreatment image 410 may be the image data of odd rows or even rows of the pretreatment image 410, but not limited to. In other embodiments, it is able to continuously read image data of a plurality of adjacent rows each time and then skip at least one pixel row without being read. In other words, when the processing unit 43 identifies that the image sensor 41 has not captured the at least one reference beacon image $I_{51}$, the processing unit 43 controls the readout circuit 42 to read only image data of partial rows of the sensing matrix of the image sensor 41 and the captured image now is served as the pretreatment image 410. When the processing unit 43 identifies that the image sensor 41 has captured the at least one reference beacon image $I_{51}$, the processing unit 43 determines a first range of interest $ROI_1$ according to the at least one reference beacon image $I_{51}$ in the image data of partial rows of the pretreatment image 410 and controls the readout circuit 42 to read only the first image data of the first range of interest $ROI_1$ in the first image 411. The processing unit 43 calculates an image feature of the at least one reference beacon image $I_{51}$ according to the first image data of the first range of interest $ROI_1$ and controls the readout circuit 42 to read only the second image data of a second range of interest $ROI_2$ in the second image 412 according to the image feature, wherein the method of controlling the readout circuit 42 to read only the second image data of a second range of interest $ROI_2$ in the second image 412 according to the image feature is similar to that of the first embodiment and thus details thereof are not repeated herein. The difference between the second embodiment and the first embodiment is that in the second embodiment the readout circuit 42 firstly reads image data of partial rows of the pretreatment image 410 so as to determine a first range of interest $ROI_1$ and reads only image data of the first range of interest $ROI_1$ in the first image 411 rather than reads image data of all the first image 411, wherein a size of the first range of interest $ROI_1$ may be previously set according the operation parameter of the interactive system (e.g. a size of the reference beacon 51 and an operation distance of the remote device 4). It should be mentioned that in FIG. 6 the areas in the pretreatment image 410, the first image 411 and the second image 412 filled with sparse dots are the pixel areas that are not read by the readout circuit 42. In addition, in other embodiments the same operation may be performed based on the pixel columns rather than pixel rows.

In addition, as the processing unit 43 may misidentify the reference beacon image $I_{51}$, in the first and second embodiments of the present disclosure, the processing unit 43 may control the readout circuit 42 to further read the second image data of partial rows of the second image 412 outside the second range of interest $ROI_2$ to confirm whether there is any reference beacon image contained in the second image 412 but not included in the second range of interest $ROI_2$. In addition, as the readout circuit 42 only needs to read a part of pixel areas of the sensing matrix of the image sensor 41, it is able to increase the frame rate to relatively improve the response speed of the system. In addition, for simplification only one reference beacon image $I_{51}$ is show in FIGS. 5 and 6. It is appreciated that the operation of one reference beacon image in these figures may be extended to the operation of a plurality of reference beacon images.

Figure 7:
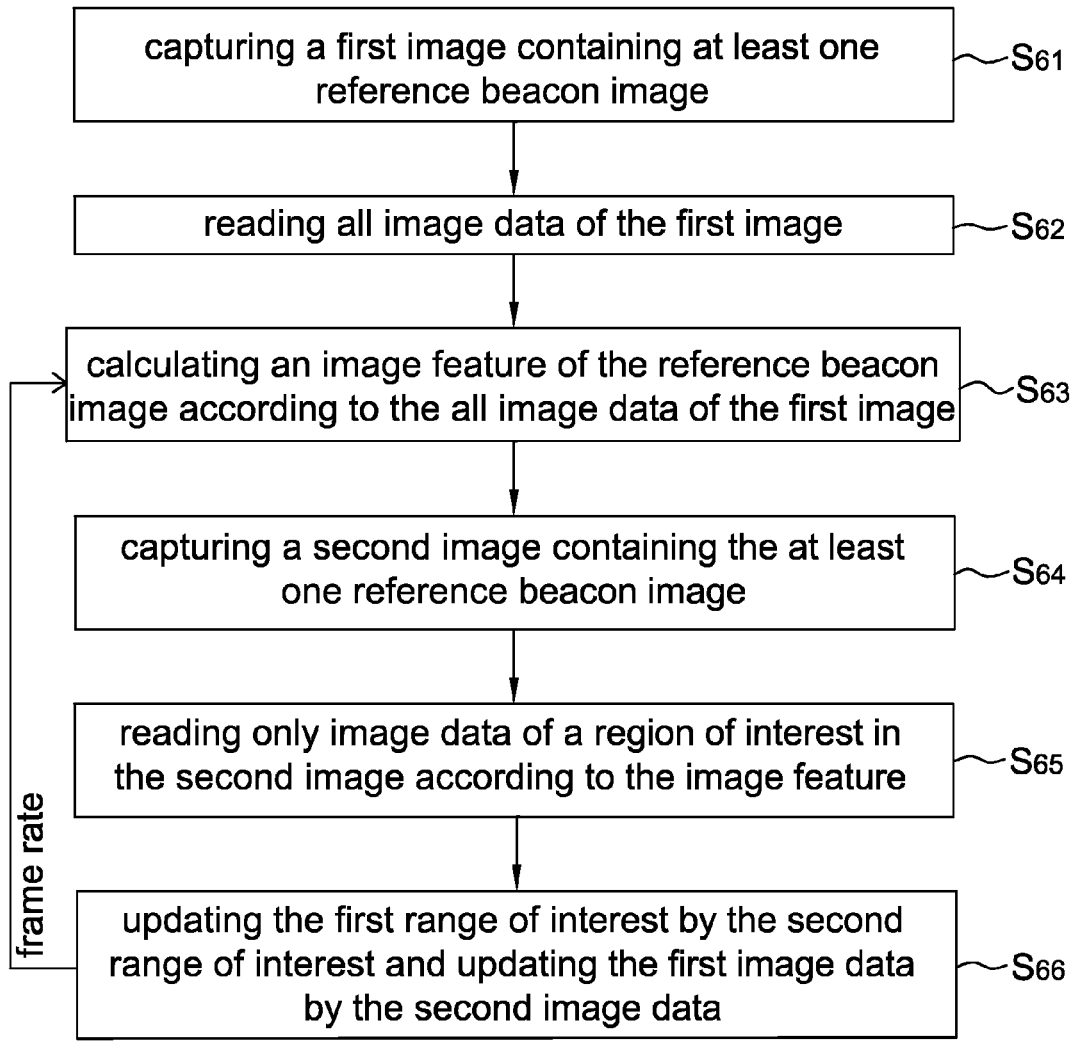
FIG. 7 shows a flow chart of the power saving method of the interactive system according to the first embodiment of the present disclosure.

Referring to FIG. 7, it shows a flow chart of the power saving method of the interactive system according to the first embodiment of the present disclosure, which includes the steps of: capturing a first image containing at least one reference beacon image (Step $S_{61}$); reading all image data of the first image (Step $S_{62}$); calculating an image feature of the at least one reference beacon image according to the all image data of the first image (Step $S_{63}$); capturing a second image containing the at least one reference beacon image (Step $S_{64}$); reading only image data of a region of interest in the second image according to the image feature (Step $S_{65}$); and updating the first range of interest by the second range of interest and updating the first image data by the second image data (Step $S_{66}$), and then the process returns to the Step $S_{63}$.

Referring to FIGS. 4A, 4B, 5 and 7 together, details of the power saving method of the interactive system according to the first embodiment of the present disclosure are described hereinafter.

Step $S_{61}$: The image sensor 41 firstly captures a first image 411 containing at least one reference beacon image $I_{51}$.

Step $S_{62}$: The readout circuit 42 sequentially reads all image data of the first image 411.

Step $S_{63}$: The processing unit 43 calculates an image feature of the at least one reference beacon image $I_{51}$ according to the all image data of the first image 411. As mentioned above, the image feature may include at least one of an image position, an image size, an image intensity and a motion vector of the reference beacon image.

Step $S_{64}$: Next, the image sensor 41 captures a second image 412 containing the at least one reference beacon image (e.g. $I_{51}$').

Step $S_{65}$: The processing unit 43 determines a range of interest ROI of the sensing matrix according to the image feature so as to control the readout circuit 42 to read only image data of the range of interest ROI in the second image 412 but not to read image data outside the range of interest ROI. In one embodiment, the processing unit 43 may determine a first range of interest $ROI_1$ in the first image 411 according to an image position of the at least one reference beacon image $I_{51}$ and estimate a second range of interest $ROI_2$ in the second image 412 corresponding to the first range of interest $ROI_1$ according to a motion vector MV of the reference beacon image $I_{51}$ (the top right diagram of FIG. 5). In another embodiment, the processing unit 43 may determine a first range of interest $ROI_1$ in the first image 411 according to an image position of the reference beacon image $I_{51}$ and estimate a second range of interest $ROI_2$ in the second image 412 corresponding to the first range of interest $ROI_1$ according to an expansion parameter pd (the lower right diagram of FIG. 5). As mentioned above, the motion vector MV and the expansion parameter pd may be predetermined values or calculated by the processing unit 43 according to a plurality of images captured previous to the second image 412. As an object of this embodiment is to reduce the power consumption, the second range of interest $ROI_2$ is smaller than a size of the second image 412. In other embodiments, if a predetermined expansion parameter is used and the operation parameter of the interactive system is previously known, it may not determine the first range of interest $ROI_1$ in the first image 411 at first. The second range of interest $ROI_2$ may be set directly according to the predetermined expansion parameter as long as an image position of the reference beacon image $I_{51}$ in the first image 411 is known.

Step $S_{66}$: Finally, the processing unit 43 updates the first range of interest $ROI_1$ by the second range of interest $ROI_2$ and updates the first image data by the second image data, and then the process returns to the Step $S_{63}$.

After returning to the Step $S_{63}$, the processing unit 43 calculates an updated image feature of the at least one reference beacon image $I_{51}$ according to the updated first image data (i.e. Step $S_{63}$); the processing unit 43 updates the second image by a new captured image (i.e. Step $S_{64}$), i.e. the image sensor 41 capturing a new image to be served as the updated second image 412; and the processing unit 43 controls the readout circuit 42 to read only second image data of a second range of interest $ROI_2$ in the updated second image 412 according the updated image feature (i.e. Step $S_{65}$).

The processing unit 43 may track the reference beacon image according to the correlation between the first image 411 and the second range of interest $ROI_2$ and interact with the image display 5 according to the tracking result, and the Steps $S_{63}$-$S_{66}$ may be repeatedly executed so as to continuously track the motion of the reference beacon image. For example, the Steps $S_{63}$-$S_{66}$ may be executed repeatedly at the frame rate.

In this embodiment, in order to avoid the control error, the processing unit 43 may control the readout circuit 42 to further read, every predetermined time interval, the image data of partial rows of the second image 412 outside the second range of interest $ROI_2$ so as to confirm whether there is any reference beacon image is not read, wherein the predetermined time interval may be determined according to the required accuracy and different applications.

Figure 8:
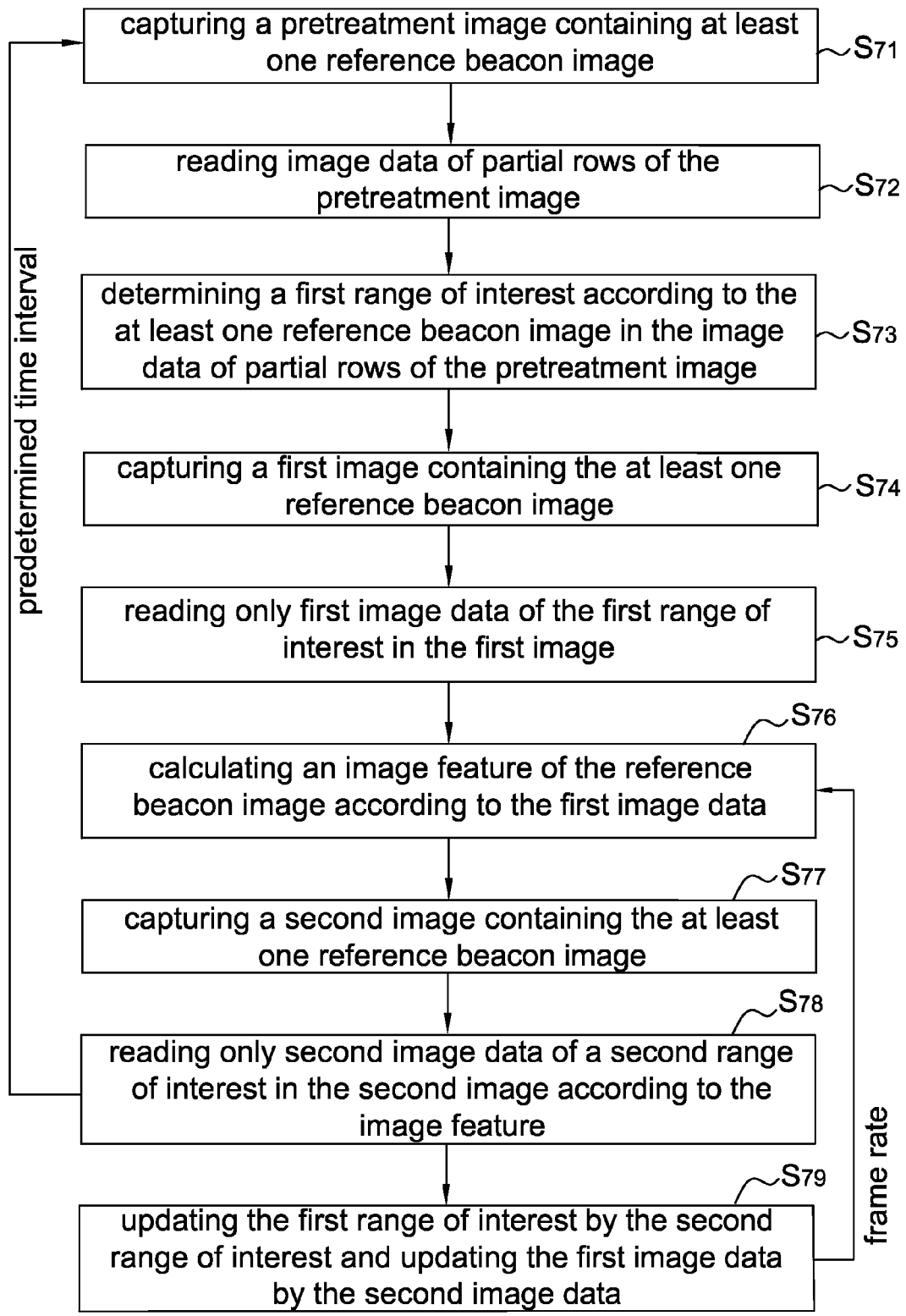
FIG. 8 shows a flow chart of the power saving method of the interactive system according to the second embodiment of the present disclosure.

Referring to FIG. 8, it shows a flow chart of the power saving method of the interactive system according to the second embodiment of the present disclosure, which includes the steps of: capturing a pretreatment image containing at least one reference beacon image (Step $S_{71}$); reading image data of partial rows of the pretreatment image (Step $S_{72}$); determining a first range of interest according to the at least one reference beacon image in the image data of partial rows of the pretreatment image (Step $S_{73}$); capturing a first image containing the at least one reference beacon image (Step $S_{74}$); reading only first image data of the first range of interest in the first image (Step $S_{75}$); calculating an image feature of the at least one reference beacon image according to the first image data (Step $S_{76}$); capturing a second image containing the at least one reference beacon image (Step $S_{77}$); reading only second image data of a second range of interest in the second image according to the image feature (Step $S_{78}$); and updating the first range of interest by the second range of interest and updating the first image data by the second image data (Step $S_{79}$), and next the process returns to the Step $S_{76}$. As an object of this embodiment is to reduce the power consumption, the second range of interest is smaller than a size of the second image.

Referring to FIGS. 4A, 4B, 6 and 8 together, details of the power saving method of the interactive system according to the second embodiment of the present disclosure are described hereinafter.

Step $S_{71}$: The image sensor 41 captures a pretreatment image 410. As mentioned above, the pretreatment image 410 is used to confirm whether the reference beacon enters a field of view of the image sensor 41.

Step $S_{72}$: In order to reduce the power consumption, the readout circuit 42 reads only image data of partial rows of the pretreatment image 410, wherein said image data of partial rows of the pretreatment image 410 may be, but not limited to, the image data of odd rows or even rows of the pretreatment image 410. The readout circuit 42 may also continuously read more than two adjacent rows each time and then skip at least one row of image data as long as image data of partial rows of the pretreatment image 410 is captured. For example in the top middle diagram of FIG. 6, the readout circuit 42 reads only the blank pixel rows but does not read the pixel rows filled with sparse dots. When the image sensor 41 has not captured the reference beacon image $I_{51}$ of the reference beacon 51, the process returns to the Step $S_{71}$. When the reference beacon image $I_{51}$ of the reference beacon 51 is captured, the process enters the Step $S_{73}$.

Step $S_{73}$: The processing unit 43 determines a first range of interest $ROI_1$ of the sensing matrix according to the at least one reference beacon image $I_{51}$ in the image data of partial rows of the pretreatment image 410. For example, the processing unit 43 may determine a position of the first range of interest $ROI_1$ according to an image position of the at least one reference beacon image $I_{51}$ and may determine a size of the first range of interest $ROI_1$ according to the operation parameter of the interactive system, e.g. a size of the reference beacon 51 and/or an operation distance of the remote device 4.

Step $S_{74}$: Next, the image sensor 41 captures a first image 411 containing the at least one reference beacon image $I_{51}$.

Step $S_{75}$: When the first range of interest $ROI_1$ has been determined, the processing unit 43 controls the readout circuit 42 to read only first image data of the first range of interest $ROI_1$ in the first image 411 and not to read the image data in the first image 411 outside the first range of interest $ROI_1$ so as to reduce the power consumption. As mentioned above, in this embodiment it is able to further increase the frame rate as so to improve the system response speed.

Step $S_{76}$: The processing unit 43 may calculate an image feature of the at least one reference beacon image $I_{51}$ according to the first image data. As mentioned above, the image feature may include at least one of an image position, an image size, an image intensity and a motion vector of the reference beacon image $I_{51}$.

Step $S_{77}$: Next, the image sensor 41 captures a second image 412 containing the at least one reference beacon image (e.g. $I_{51}'$).

Step $S_{78}$: The processing unit 43 determines a second rang of interest $ROI_2$ of the sensing matrix according to the image feature and controls the readout circuit 42 to read only second image data of the second range of interest $ROI_2$ in the second image 412 and not to read the image data in the second image 412 outside the second range of interest $ROI_2$, wherein details of this step are similar to those of the Step $S_{65}$ of the first embodiment and thus are not repeated herein.

Step $S_{79}$: Finally, the processing unit 43 updates the first range of interest $ROI_1$ by the second range of interest $ROI_2$, and updates the first image data by the second image data. Then, the process returns to the Step $S_{76}$.

After returning to the Step $S_{76}$, the processing unit 43 calculates an updated image feature of the at least one reference beacon image $I_{51}$ according to the updated first image data (i.e. Step $S_{76}$); the processing unit 43 updates the second image by a new captured image (i.e. Step $S_{77}$), i.e. the image sensor 41 capturing a new image to be served as the updated second image 412; and the processing unit 43 controls the readout circuit 42 to read only second image data of a second range of interest $ROI_2$ in the updated second image 412 according the updated image feature (i.e. Step $S_{78}$).

The processing unit 43 may track the reference beacon image according to the correlation between the first range of interest $ROI_1$ and the second range of interest $ROI_2$ and interact with the image display 5 according to the tracking result, and the Steps $S_{76}$-$S_{79}$ may be repeatedly executed so as to continuously track the motion of the reference beacon image. For example, the Steps $S_{76}$-$S_{79}$ may be executed repeatedly at the frame rate.

Similarly, in addition to repeatedly executing the Steps $S_{76}$-$S_{79}$, in order to avoid the control error, the interactive system may be set to return from the Step $S_{78}$ to the Step $S_{71}$ every predetermined time interval to execute the power saving method of the second embodiment of the present disclosure in case there is other reference beacon image outside the reference of interest ROI. That is, even though the reference beacon image has been captured, the pretreatment image 410 may still be captured every predetermined time interval in order to increase the operation accuracy. In addition, the processing unit 43 may control the readout circuit 42 to further read, every predetermined time interval, the second image data of partial rows of the updated second image 412 outside the second range of interest $ROI_2$ in order to increase the operation accuracy. In this embodiment, the predetermined time interval may be determined according to the required system accuracy and different applications.

As mentioned above, the conventional power saving method of an interactive system has the problem of unable to efficiently reducing the system power consumption. Therefore, the present disclosure further provides an interactive system (FIG. 4A) and a remote device (FIG. 4B) and a power saving method thereof (FIGS. 7 and 8) that may read and post-process a part of image data of a sensing matrix so as to effectively reduce the system power consumption. In addition, when the image sensor has not captured the reference beacon image, the system power consumption may further be reduced by reading only partial rows of the image data.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A remote device, comprising:
an image sensor configured to successively capture a first image and a second image containing at least one reference beacon image, and capture a pretreatment image containing the at least one reference beacon image before capturing the first image;
a readout circuit configured to read first image data of the first image and second image data of the second image from the image sensor, and read image data of partial rows of the pretreatment image from the image sensor; and
a processing unit configured to calculate an image feature of the at least one reference beacon image according to the first image data and control the readout circuit to read only the second image data of a range of interest in the second image according to the image feature, wherein the range of interest is smaller than the second image.

2. The remote device as claimed in claim 1, wherein the image feature comprises at least one of an image position, an image size, an image intensity and a motion vector of the at least one reference beacon image.

3. The remote device as claimed in claim 1, wherein the range of interest is a pixel range with a predetermined shape or a plurality of pixel rows.

4. The remote device as claimed in claim 1, wherein the processing unit is configured to determine a first range of interest in the first image according to an image position of the at least one reference beacon image and estimate a second range of interest, configured as the range of interest, in the second image corresponding to the first range of interest according to a motion vector of the at least one reference beacon image or an expansion parameter.

5. The remote device as claimed in claim 4, wherein the motion vector and the expansion parameter are predetermined values or calculated by the processing unit according to a plurality of images captured previous to the second image.

6. The remote device as claimed in claim 1, wherein the processing unit is configured to determine a first range of interest according to the at least one reference beacon image in the image data of the partial rows of the pretreatment image and control the readout circuit to only read the first image data of the first range of interest in the first image for calculating the image feature.

7. The remote device as claimed in claim 1, wherein the image data of the partial rows of the pretreatment image is image data of odd rows or even rows of the pretreatment image.

8. The remote device as claimed in claim 1, wherein the range of interest is larger than or equal to an image size of the at least one reference beacon image.

9. The remote device as claimed in claim 1, wherein at least one reference beacon is integrated with an image display.

10. A power saving method of an interactive system, comprising:
    successively capturing, using an image sensor, a pretreatment image and a first image containing at least one reference beacon image;
    reading, using a readout circuit, image data of partial rows of the pretreatment image;
    determining, using a processing unit, a first range of interest according to the at least one reference beacon image in the image data of partial rows of the pretreatment image;
    reading, using the readout circuit, only first image data of the first range of interest in the first image; and
    calculating, using the processing unit, an image feature of the at least one reference beacon image according to the first image data.

11. The power saving method as claimed in claim 10, wherein the image data of partial rows of the pretreatment image is image data of odd rows or even rows of the pretreatment image.

12. The power saving method as claimed in claim 10, wherein the processing unit determines the first range of interest according to an image position of the at least one reference beacon image.

13. The power saving method as claimed in claim 10, further comprising:
    capturing, using the image sensor, a second image containing the at least one reference beacon image; and
    controlling, using the processing unit, the readout circuit to only read second image data of a second range of interest in the second image according to the image feature, wherein the second range of interest is smaller than the second image.

14. The power saving method as claimed in claim 13, further comprising:
    updating the first range of interest by the second range of interest and updating the first image data by the second image data;
    calculating, using the processing unit, an updated image feature of the at least one reference beacon image according to the updated first image data;
    updating the second image by a new captured image; and
    controlling, using the processing unit, the readout circuit to read only second image data of a second range of interest in the updated second image according to the updated image feature.

15. The power saving method as claimed in claim 14, wherein the pretreatment image is captured every predetermined time interval.

16. The power saving method as claimed in claim 14, further comprising:
    controlling, using the processing unit, the readout circuit to further read the second image data of partial rows of the updated second image outside the second range of interest every predetermined time interval.

17. A power saving method of an interactive system, comprising:
    sequentially capturing, using an image sensor, a first image and a second image containing at least one reference beacon image;
    reading, using a readout circuit, all image data of the first image;
    calculating, using a processing unit, an image feature of the at least one reference beacon image according to the all image data of the first image; and
    controlling, using the processing unit, the readout circuit to read image data of a range of interest in the second image according to the image feature and read image data of partial rows of the second image outside the range of interest, wherein the range of interest is smaller than the second image.

18. The power saving method as claimed in claim 17, wherein the processing unit is configured to determine a first range of interest in the first image according to an image position of the at least one reference beacon image and estimate a second range of interest, configured as the range of interest, in the second image corresponding to the first range of interest according to a motion vector of the at least one reference beacon image or an expansion parameter.

19. The power saving method as claimed in claim 18, wherein the motion vector and the expansion parameter are predetermined values or calculated by the processing unit according to a plurality of images captured previous to the second image.

20. A remote device, comprising:
    an image sensor configured to successively capture a first image and a second image containing at least one reference beacon image;
    a readout circuit configured to read first image data of the first image and second image data of the second image from the image sensor; and
    a processing unit configured to calculate an image feature of the at least one reference beacon image according to the first image data, and
    control the readout circuit to read the second image data of a range of interest in the second image according to the image feature and read the second image data of partial rows of the second image outside the range of interest, wherein the range of interest is smaller than the second image.

* * * * *